United States Patent
Cho

(10) Patent No.: US 6,795,118 B1
(45) Date of Patent: Sep. 21, 2004

(54) TESTING OF SOLID-STATE IMAGE SENSORS

(75) Inventor: Kwang-Bo Cho, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 500 days.

(21) Appl. No.: 09/692,742

(22) Filed: Oct. 18, 2000

(51) Int. Cl.[7] .............................................. H04N 9/64
(52) U.S. Cl. ...................................... 348/246; 348/250
(58) Field of Search .............................. 348/180, 187, 348/188, 189, 190, 207.99, 246, 247, 272, 294, 250; 250/208.1; H04N 17/00

(56) References Cited

U.S. PATENT DOCUMENTS

| | | | | |
|---|---|---|---|---|
| 5,920,344 A | * | 7/1999 | Kim | 348/246 |
| 6,002,433 A | * | 12/1999 | Watanabe et al. | 348/246 |
| 6,219,443 B1 | * | 4/2001 | Lawrence | 382/141 |
| 6,248,990 B1 | * | 6/2001 | Pyyhtia et al. | 250/208 |
| 6,381,357 B1 | * | 4/2002 | Tan et al. | 382/141 |
| 6,396,539 B1 | * | 5/2002 | Heller et al. | 348/246 |
| 6,515,702 B1 | * | 2/2003 | Yadid-Pecht et al. | 348/308 |
| 6,529,622 B1 | * | 3/2003 | Pourjavid | 382/149 |
| 6,535,621 B1 | * | 3/2003 | Fujita | 382/112 |

* cited by examiner

*Primary Examiner*—Andrew Christensen
*Assistant Examiner*—Heather R. Long
(74) *Attorney, Agent, or Firm*—Dickstein Shapiro Morin & Oshinsky LLP

(57) ABSTRACT

An image sensor testing system is described. The system includes a differencing element, first and second comparators, and a counter. The differencing element is arranged to provide a difference value between a given pixel value and a pixel stream value. The first comparator operates to compare the difference value with at least one tolerance value. The counter is configured to increment a count when the difference value exceeds at least one tolerance value. The second comparator is configured to indicate a sensor as having failed if the count exceeds at least one threshold value.

13 Claims, 3 Drawing Sheets

TESTING OF SOLID-STATE IMAGE SENSORS

BACKGROUND

The present disclosure generally relates to solid-state image sensor devices, and specifically to testing of pixels in such devices.

Solid-state image sensor devices, such as charge-coupled devices (CCD) or active pixel sensors (APS), are widely used to capture images. Wide use of these devices has led to a demand for faster and more reliable testing of pixel arrays on these devices.

The pixel arrays may be excited with a uniform or patterned illumination. The response is often measured or evaluated manually by visually inspecting a screen projected on a monitor. However, visual inspection may require a limited number of inspectors who are capable of making precise and consistent qualitative judgment. Furthermore, the inspection process may be time-consuming.

SUMMARY

The present disclosure describes an image sensor testing system. The system includes a differencing element, first and second comparators, and a counter.

The differencing element is arranged to provide a difference value between a given pixel value and a pixel stream value. The first comparator operates to compare the difference value with at least one tolerance value. The counter is configured to increment a count when the difference value exceeds at least one tolerance value. The second comparator is configured to indicate a sensor as having failed if the count exceeds at least one threshold value.

The present disclosure also describes a method for testing an image sensor. The method includes computing a difference between a given pixel value and a pixel stream value, and comparing the difference with a specified tolerance value. A count is incremented when the difference exceeds the specified tolerance value. The image sensor is indicated as having failed the test if the count exceeds a specified threshold value.

The present disclosure further describes an image sensor, which includes a pixel array, a readout circuit, a controller, and a sensor testing system. The pixel array includes pixels arranged in an array. Each pixel is configured to sense light coming from a direction corresponding to a position of each pixel. The readout circuit operates to read out signals stored in the pixel array. The controller is configured to provide timing and control signals to enable the read out of the signals. The sensor testing system provides similar functions as the image sensor testing system described above.

BRIEF DESCRIPTION OF THE DRAWINGS

Different aspects of the disclosure will be described in reference to the accompanying drawings wherein.

DETAILED DESCRIPTION

In recognition of the above-described difficulties, the inventor recognized the need for a quick and easy method of testing the solid-state image sensor devices.

Figure 1:
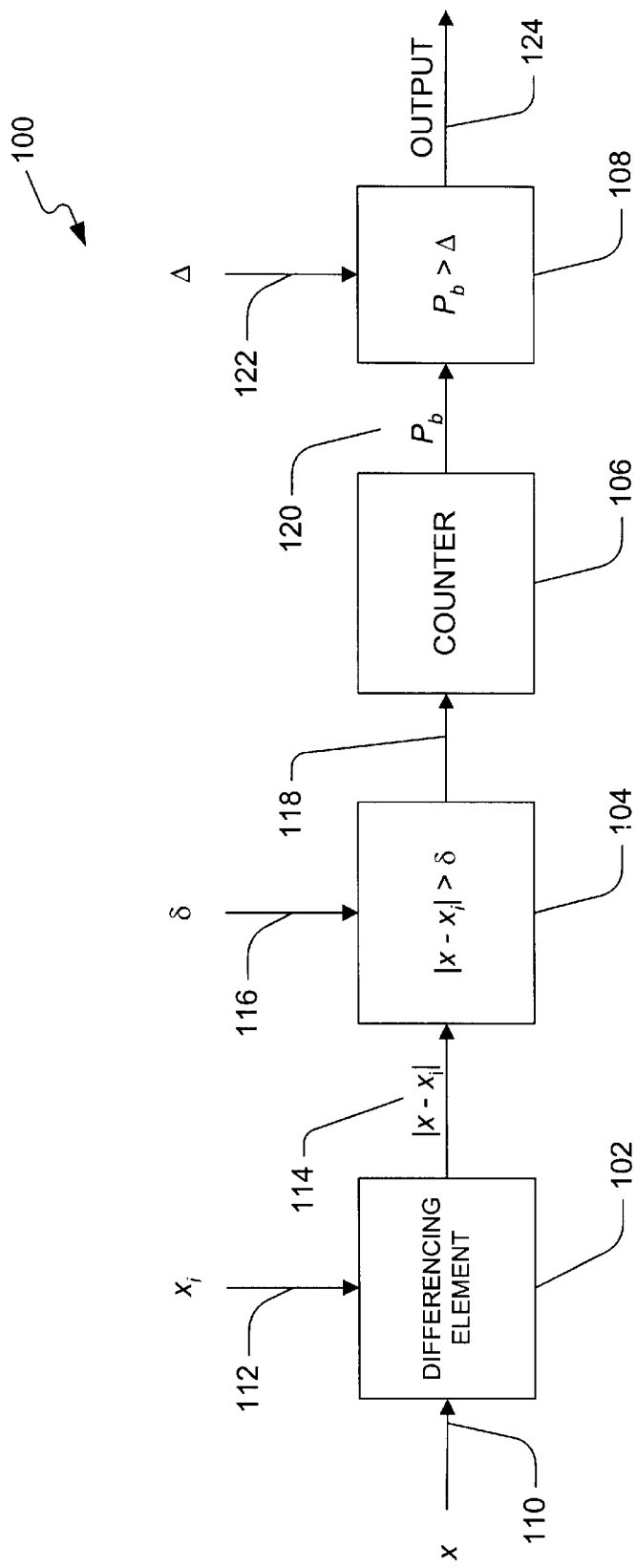
FIG. 1 illustrates an embodiment of a sensor testing system arranged to provide testing of a pixel array.

FIG. 1 illustrates an embodiment of a sensor testing system 100 arranged to provide testing of a pixel array. The system 100 includes a differencing element 102, two comparators 104, 108, and a counter 106. The system 100 provides overall testing of the pixel array by testing each pixel in the differencing element 102 and the comparator 104.

The differencing element 102 may receive a given pixel value 110 and a pixel stream value 112, and produce an absolute value difference 114 between the two values 110, 112. In the illustrated embodiment, the given pixel value 110 is the value of the pixel to be tested. The given pixel, in general, may be any chosen pixel in an image array. The given pixel value may also be a processed value, such as an average value of selected pixels.

The pixel stream value 112 may be the value from each of the other pixels in the pixel array sensed under substantially similar light conditions. In other embodiments, such as when the pixel array is excited with a patterned illumination, the pixel stream value 112 may be a value from each of the other pixels in a window of pixels. A pixel array may contain one or more windows. The pixels in the window may be appropriately indexed to facilitate the selection of a pixel for streaming. Thus, the differencing element 102 provides a sensitivity deviation measure of a given pixel within the pixel array or window.

The first comparator 104 may receive the absolute value difference 114 from the differencing element 102, and a tolerance value ($\delta$) 116. The tolerance value 116 provides a measure of an acceptable difference between a given pixel and other pixels. In the illustrated embodiment, the comparator 104 compares this difference 114 with the tolerance value 116, and indicates a given pixel as a bad pixel if the difference 114 exceeds the tolerance value 116. Thus, the output 118 of the first comparator 104 quantifies a qualitative parameter of determining whether a given pixel is good or bad.

In other embodiments, multiple tolerance values (e.g. $\delta_1$, $\delta_2$, ... $\delta_n$) may be provided for comparing the given pixel with pixel values from different regions within the pixel array or window. For example, a first tolerance value ($\delta_1$) may be used to compare the difference taken of the given pixel value with a pixel value from a first region, while a second tolerance value ($\delta_2$) is used to compare the difference taken of the given pixel value with a pixel value from a second region. Therefore, a series of tolerance values may be programmed for each pixel in the pixel array or window.

In a further embodiment, the tolerance values may be adjusted to use the combination of the differencing element 102 and the first comparator 104 to compress the pixel stream data. In this embodiment, each pixel stream value may be represented with a single bit output 118 of the comparator 104.

In the illustrated embodiment, the counter 106 receives the output 118 of the first comparator 104, which indicates whether the difference 114 is above or below the specified tolerance value 116. The counter 106 is configured to count and output the number of indicated bad pixels ($P_b$) 120. In other embodiments, the counter 106 may be configured to count the number of indicated good pixels.

The output 120 of the counter 106 that indicates the number of bad pixels within a pixel array or a pixel window may then be inputted into the second comparator 108. The comparator 108 may also receive a threshold value ($\Delta$) 122 that provides a cutoff value for an acceptable number of bad pixels in an image sensor. In the illustrated embodiment, the sensor is indicated (via output 124) as having failed the test, if the number of bad pixels indicated by the counter 106 exceeds the threshold value 122. In one implementation, the number of good or bad pixels may be output (via 124) and represented as the histogram of the image array. The histogram may be used for post processing of the image.

In a further embodiment, multiple threshold values are provided (e.g. $\Delta_1, \Delta_2, \ldots, \Delta_n$). For example, three different threshold values may be used to threshold bad pixel counts of three different colors, such as red (R), green (G), and blue (B). The threshold values may be used to locate bad pixel, such as a white or dead spot. Some form of an image post processing may be performed to compensate for data read from such a bad pixel.

Figure 2:
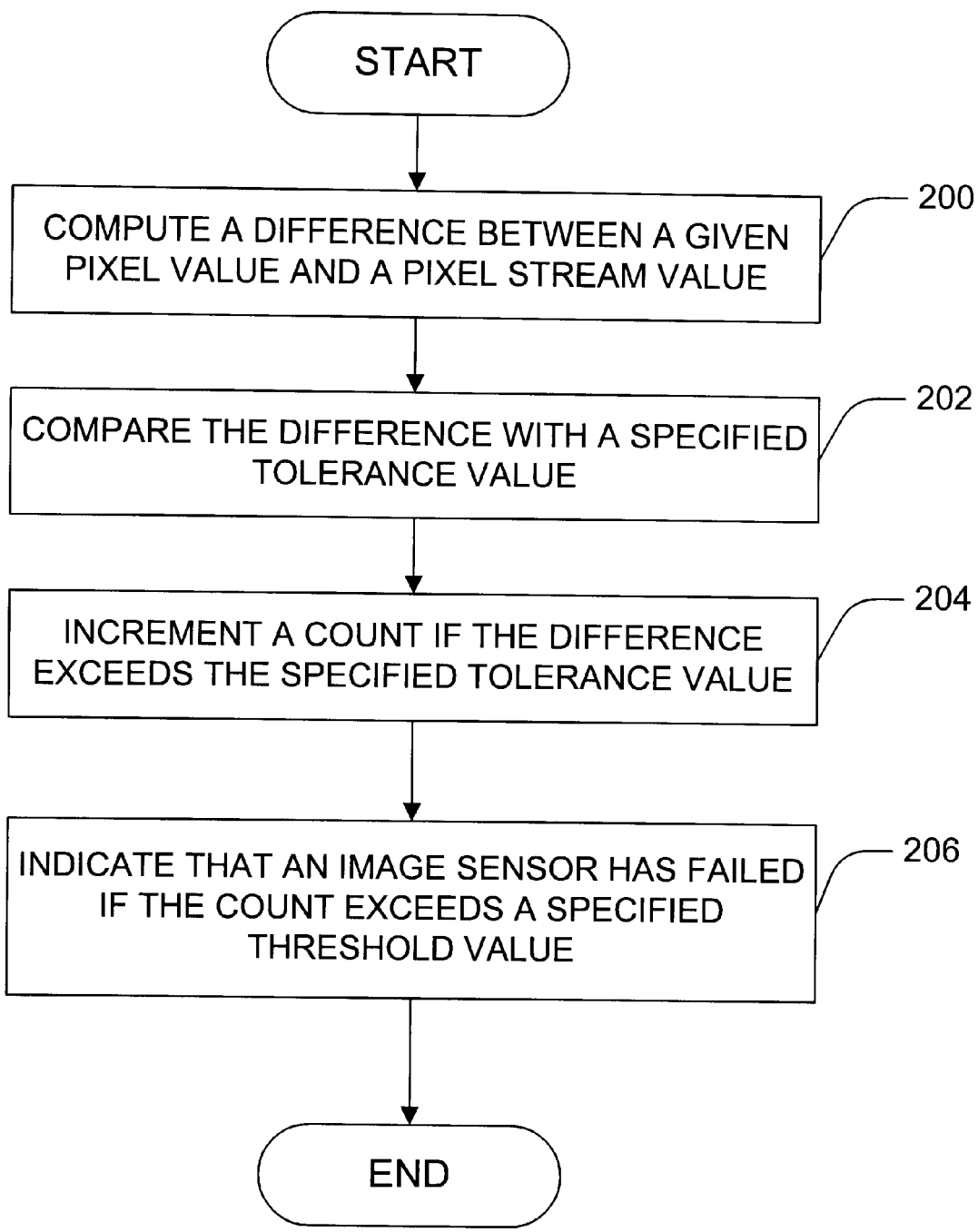
FIG. 2 shows a method for testing solid-state image sensors according to an embodiment.

A method for testing a solid-state image sensor according to an embodiment is illustrated in FIG. 2. The method includes computing a difference between a given pixel value and a pixel stream value at 200, and comparing the difference with a specified tolerance value at 202. The comparison may be made with a plurality of pixel stream values. At 204, a count is incremented if the difference exceeds the specified tolerance value. An image sensor is then indicated as having failed the test (at 206) if the count exceeds a specified threshold value.

Figure 3:
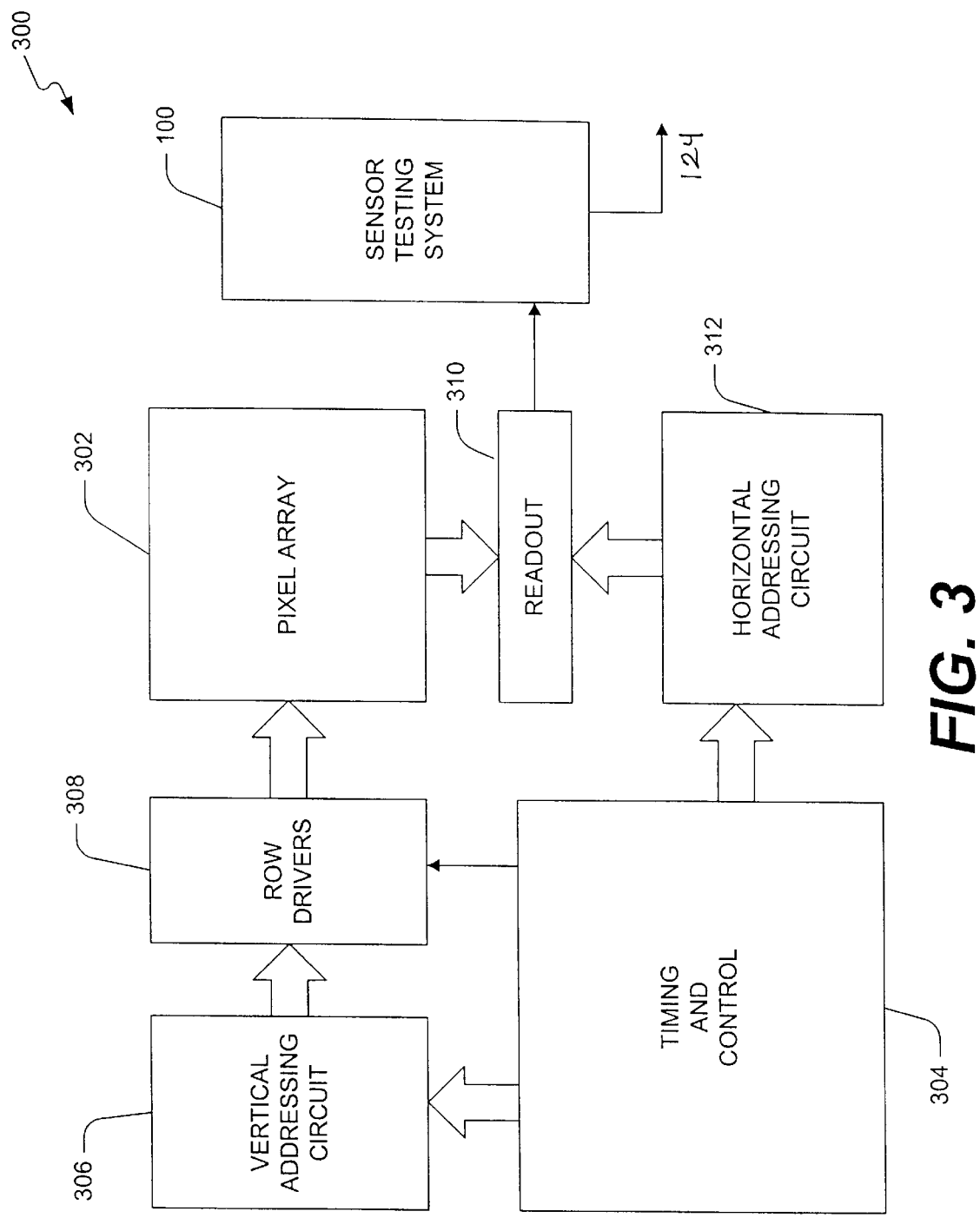
FIG. 3 is a block diagram of a solid-state image sensor device in accordance with an embodiment of the present system.

The sensor testing system 100 may be configured as one of the subsystems on an image sensor chip to provide on-chip testing of a pixel array. FIG. 3 is a block diagram of a solid-state image sensor device 300 in accordance with an embodiment of the present system. The image sensor device 300 may be configured as a single integrated chip having a pixel array of an appropriate size. The device 300 may include the sensor testing system 100, which may be built into the integrated chip. For other embodiments, the sensor testing system 100 may be resident on a chip separate from the image sensor device 300. The chips may then be integrated in a multiple-chip system.

The device 300 also includes an array of active pixel sensors 302 and a controller 304. The controller 304 provides timing and control signals to enable read out of signals stored in the pixels. For some embodiments, arrays can have dimensions of 128×128 or larger number of pixels. However, in general, the size of the array 302 will depend on the particular implementation. The image array 302 may be read out a row at a time using column-parallel readout architecture. The controller 304 selects a particular row of pixels in the array 302 by controlling the operation of vertical addressing circuit 306 and row drivers 308. Charge signals stored in the selected row of pixels are provided to a readout circuit 310. The pixels read from each of the columns can be read out sequentially using a horizontal addressing circuit 312. The output of the readout circuit 310 is directed to the sensor testing subsystem 100 for on-chip testing of the pixel array 302.

While specific embodiments of the invention have been illustrated and described, other embodiments and variations are possible. For example, the readout circuitry of the image sensor device 300 which processes the image for the sensor testing subsystem 100 may be implemented in architecture other than the column-parallel readout architecture.

All these are intended to be encompassed by the following claims.

What is claimed is:

1. An image sensor testing system, comprising:
   a differencing element arranged to provide a difference value between a given pixel value and a pixel stream value;
   a first comparator operating to compare said difference value with at least one tolerance value;
   a counter configured to increment a count when said difference value exceeds said at least one tolerance value; and
   a second comparator configured to indicate a sensor as having failed if said count exceeds at least one threshold value,
   wherein said given pixel value includes an average value of pre-selected pixels.

2. The testing system of claim 1, wherein said differencing value is an average difference between said given pixel value and a pixel stream value from a specified window of pixels.

3. The testing system of claim 1, wherein said at least one threshold value comprises multiple threshold values to threshold pixel counts of three different colors.

4. The testing system of claim 1, wherein said at least one tolerance value includes different tolerance values for pixel stream values from different areas of a pixel array.

5. The testing system of claim 1, wherein said count is a bad pixel count.

6. The testing system of claim 1, wherein said count for each pixel is used to provide a histogram of an image array being tested.

7. A method for testing an image sensor, comprising:
   computing a difference between a given pixel value and a pixel stream value;
   comparing said difference with a specified tolerance value;
   incrementing a count if said difference exceeds the specified tolerance value; and
   indicating that the image sensor has failed if said count exceeds a specified threshold value,
   wherein said comparing said difference includes adjusting the specified tolerance value to provide compression of pixel stream values.

8. The method of claim 7, wherein said step of computing said difference includes computing a difference between said given pixel value and a pixel stream value from a specified window of pixels.

9. The method of claim 7, wherein the count for each pixel is used to provide a histogram of an image array of the sensor being tested.

10. An image sensor comprising:
    a pixel array having pixels arranged in an array, each pixel configured to sense light coming from a direction corresponding to a position of said each pixel;
    a readout circuit operating to read out signals stored in the pixel array;
    a controller configured to provide timing and control signals to enable said read out of the signals; and
    a sensor testing system including:
    a differencing element arranged to provide a difference value between a given pixel value and a pixel stream value;
    a first comparator operating to compare said difference value with at least one tolerance value;
    a counter configured to increment a count when said difference value exceeds said at least one tolerance value; and
    a second comparator configured to indicate a sensor as having failed if said count exceeds at least one threshold value,
    wherein said given pixel value includes an average value of pre-selected pixels.

11. The sensor of claim 10, wherein said count for each pixel is used to locate and determine white spots or dead pixel within said pixel array.

12. The sensor of claim 10, wherein said readout circuit enables read out of pixel values a row at a time using column-parallel architecture.

13. The sensor of claim 10, wherein said count for each pixel is used to provide a histogram of said array when said array is being tested.

* * * * *